Feb. 24, 1953     C. H. GAY     2,629,354
APPARATUS FOR MAKING BANDED PRESSURE VESSELS
Filed May 25, 1949     8 Sheets-Sheet 1
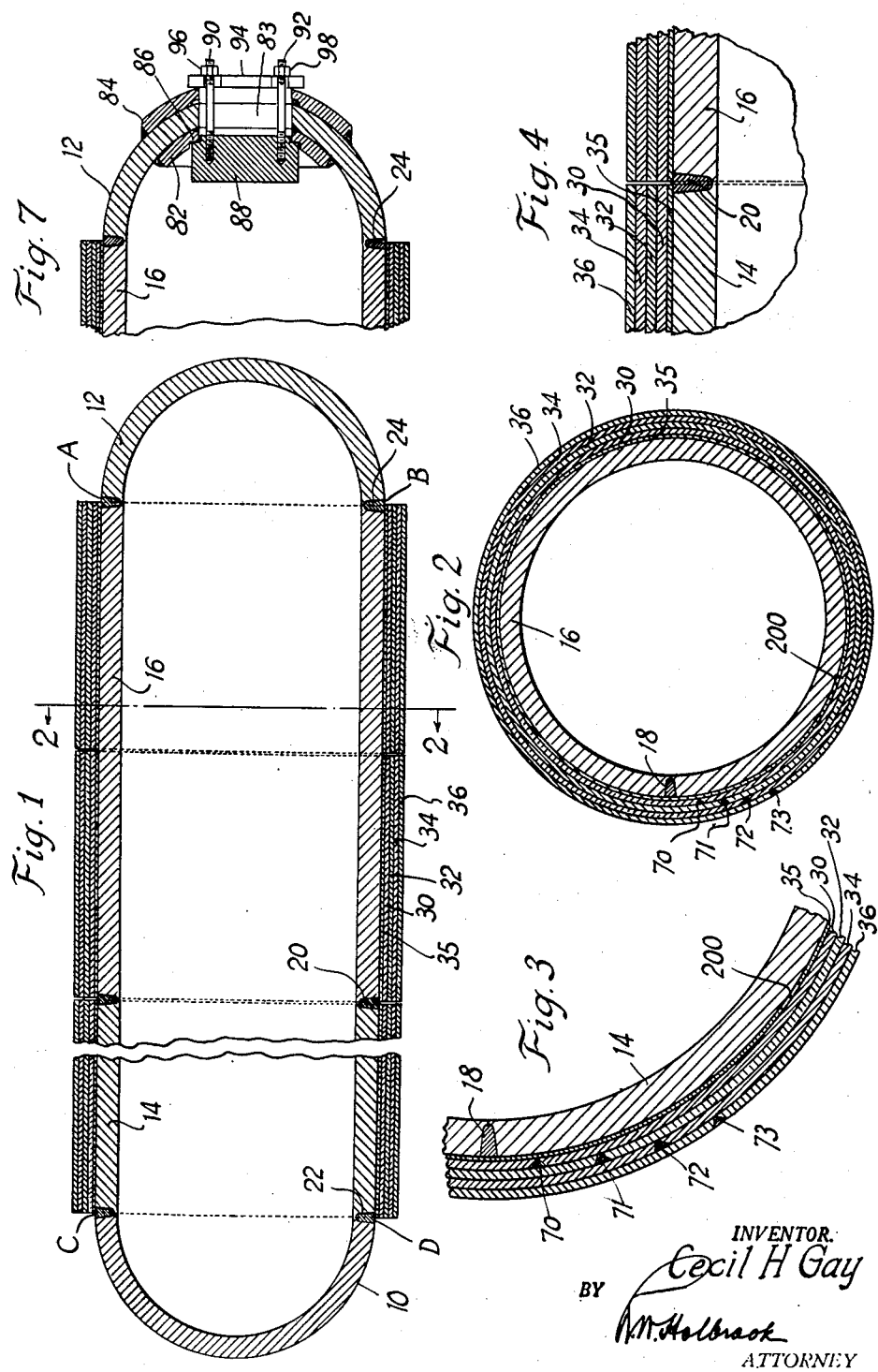
INVENTOR.
Cecil H Gay
BY
W. M. Holbrook
ATTORNEY Feb. 24, 1953
C. H. GAY
2,629,354
APPARATUS FOR MAKING BANDED PRESSURE VESSELS
Filed May 25, 1949
8 Sheets-Sheet 2
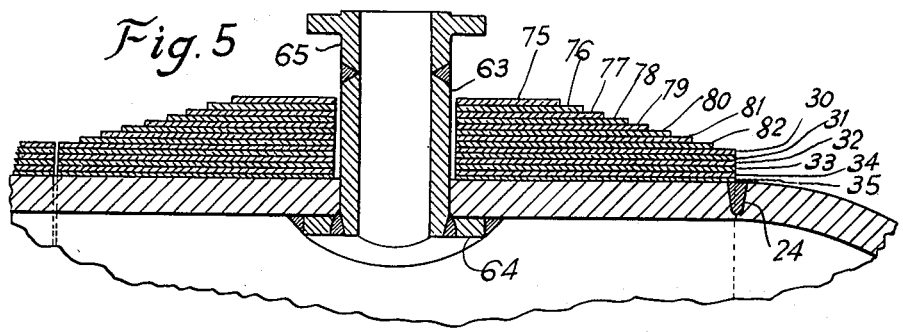
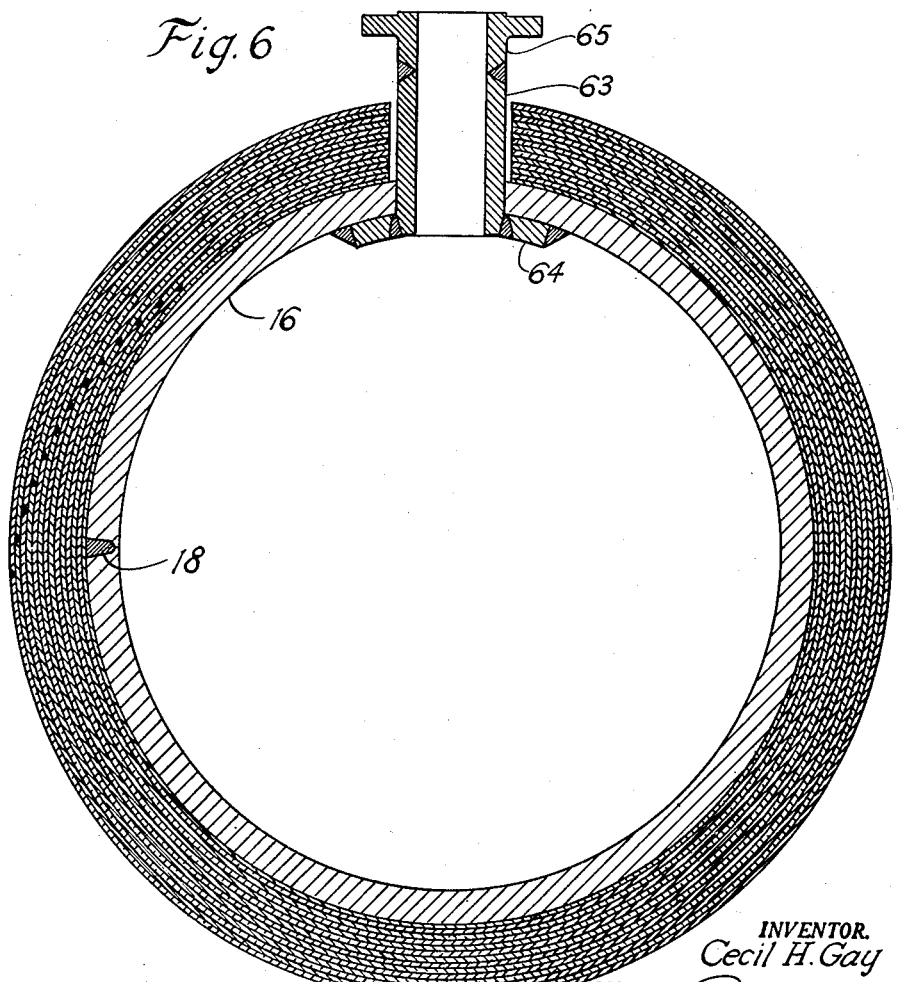
INVENTOR.
Cecil H. Gay
BY
ATTORNEY Feb. 24, 1953 C. H. GAY 2,629,354
APPARATUS FOR MAKING BANDED PRESSURE VESSELS
Filed May 25, 1949 8 Sheets-Sheet 4
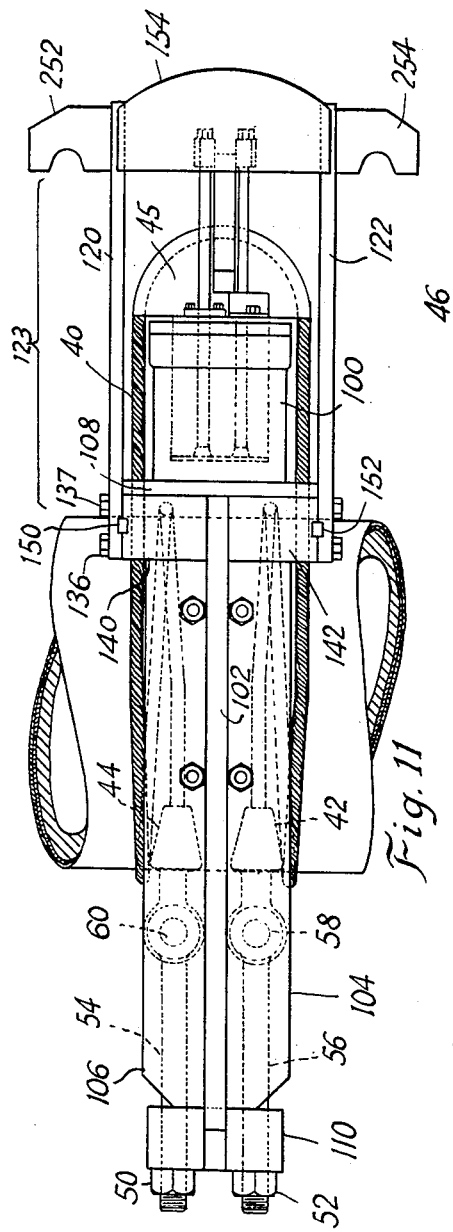
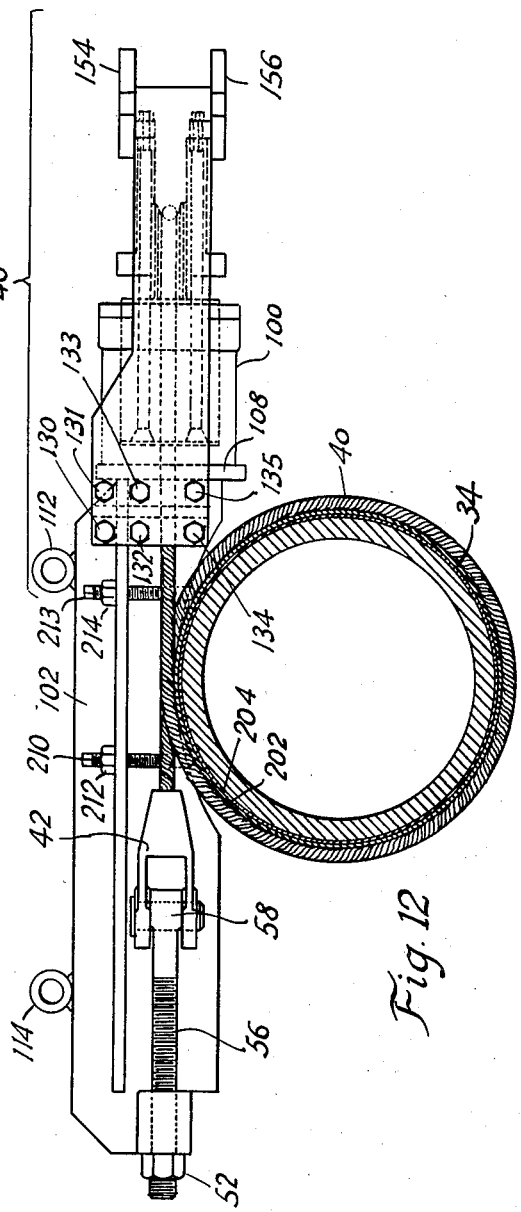
INVENTOR
*Cecil H. Gay*
BY
*W. Holbrook*, ATTORNEY Feb. 24, 1953     C. H. GAY     2,629,354
APPARATUS FOR MAKING BANDED PRESSURE VESSELS
Filed May 25, 1949     8 Sheets-Sheet 5
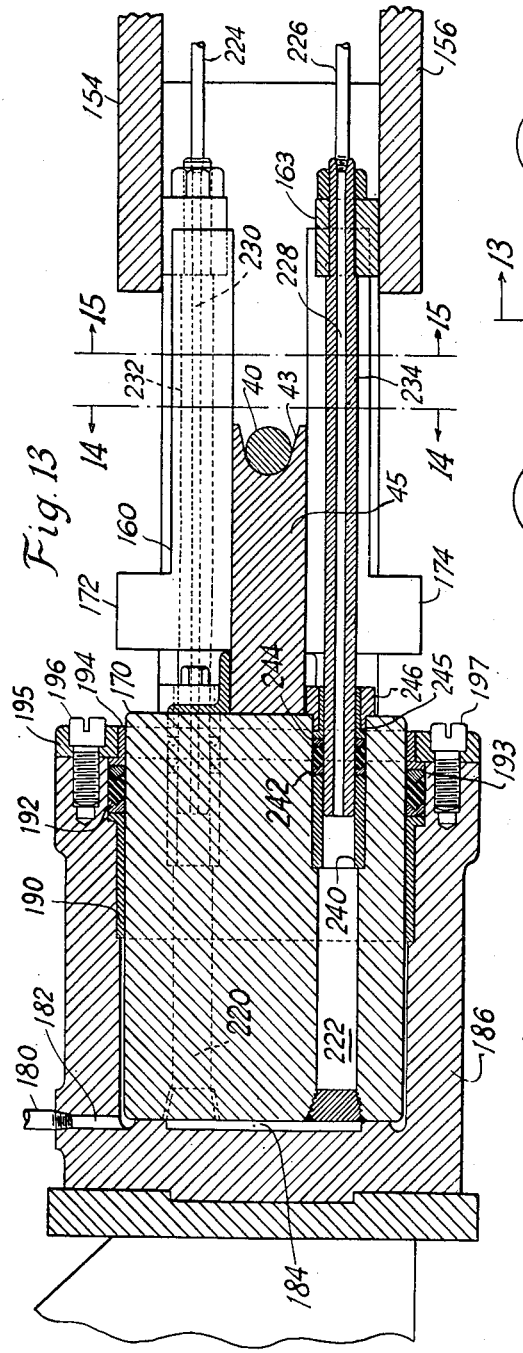
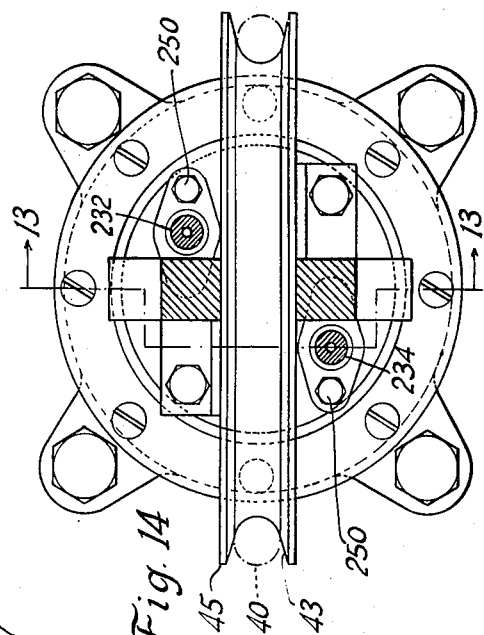
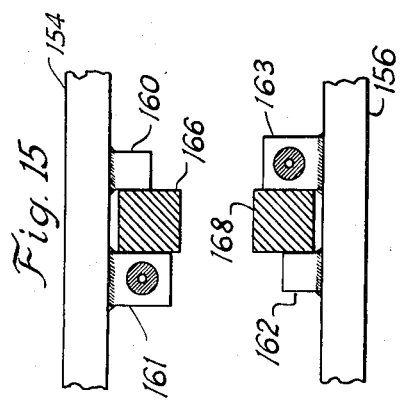
INVENTOR.
Cecil H. Gay
BY R. W. Holbrook
ATTORNEY Feb. 24, 1953  C. H. GAY  2,629,354
APPARATUS FOR MAKING BANDED PRESSURE VESSELS
Filed May 25, 1949  8 Sheets-Sheet 6

INVENTOR
Cecil H. Gay
BY
ATTORNEY

Feb. 24, 1953     C. H. GAY     2,629,354
APPARATUS FOR MAKING BANDED PRESSURE VESSELS
Filed May 25, 1949     8 Sheets-Sheet 7
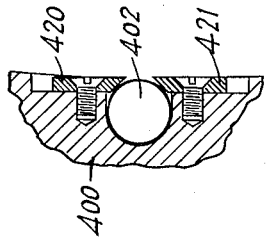
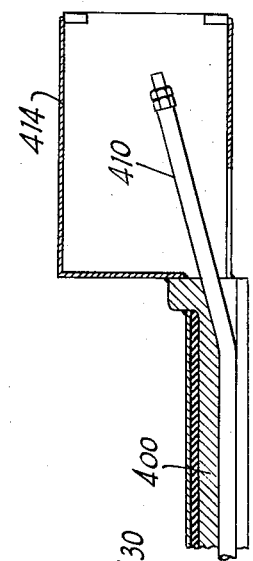
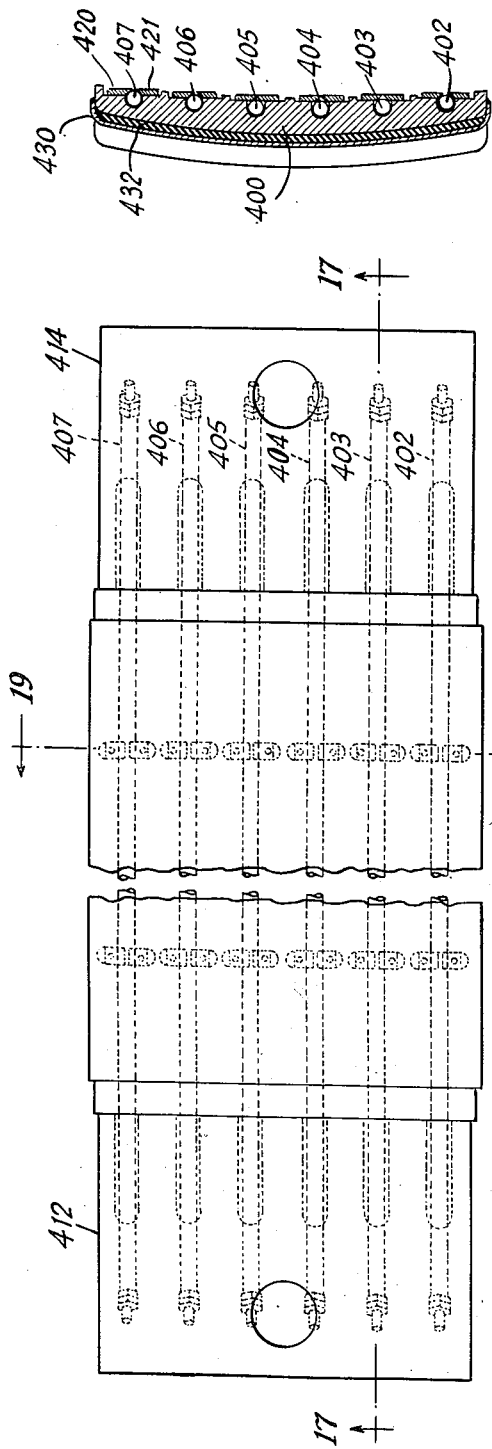
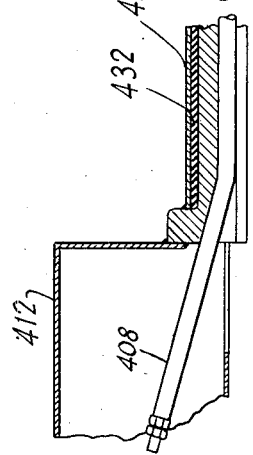
INVENTOR
*Cecil H. Gay*
BY
*R. W. Holbrook* ATTORNEY

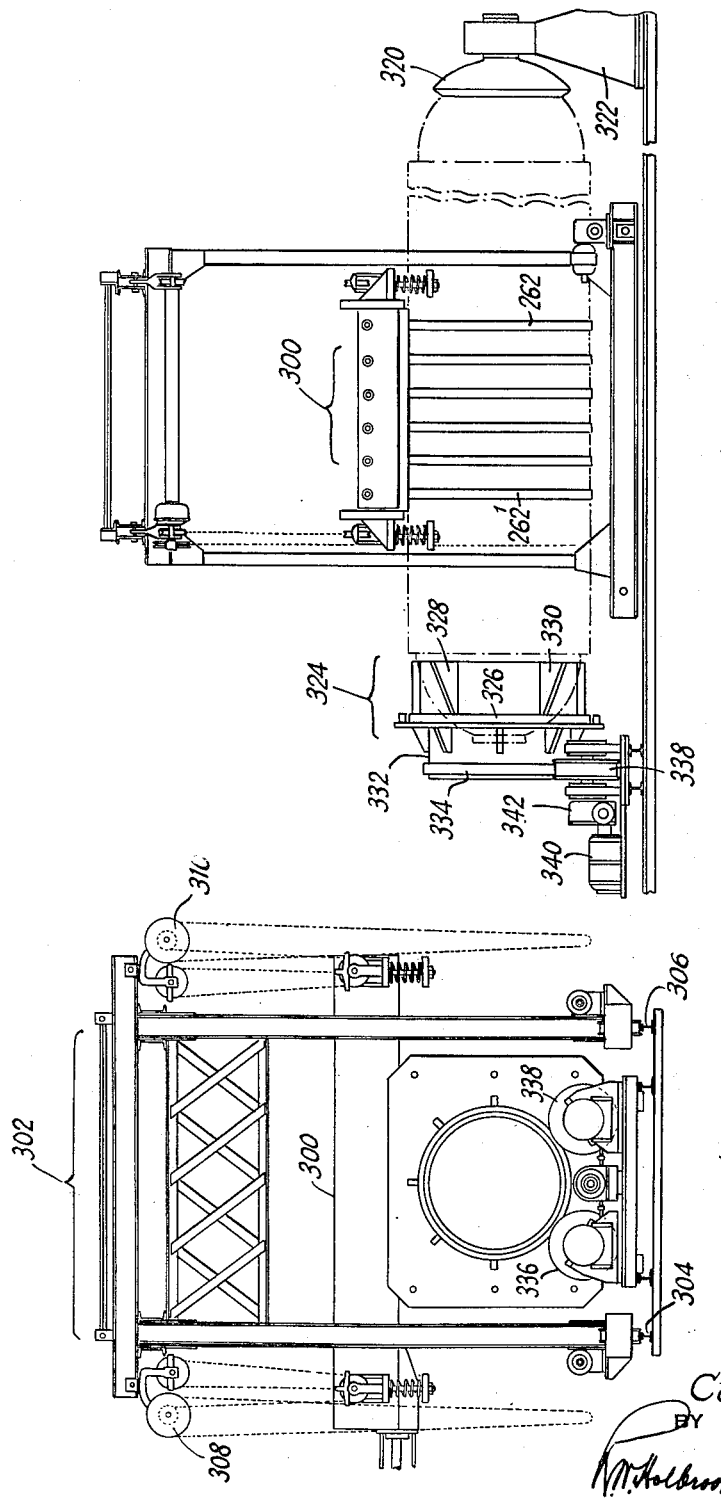

Patented Feb. 24, 1953

2,629,354

UNITED STATES PATENT OFFICE 2,629,354

APPARATUS FOR MAKING BANDED PRESSURE VESSELS

Cecil H. Gay, Akron, Ohio, assignor to The Babcock & Wilcox Company, New York, N. Y., a corporation of New Jersey Application May 25, 1949, Serial No. 95,363

6 Claims. (Cl. 113—102)

My invention relates to methods of fabricating banded pressure vessels.

The invention is particularly concerned with a method of fabricating pressure vessels which are adapted for advantageous use in industries involving operations at high fluid pressures. The walls of pressure vessels for withstanding such pressures must be of such great thickness that many difficulties have been encountered in their fabrication. For example, it has been proposed to forge such pressure vessels from a single ingot, but this process has been found to involve almost prohibitive expense. One reason for this is that the forging process involves numerous heatings and reheatings of the metal in order to maintain it at forging temperature throughout the manufacturing operations. The pertinent pressure vessel eliminates such operations.

The invention presents a method of manufacturing a composite pressure vessel construction the inner part of which includes a welded shell of uniform plate thickness with hemispherical heads of the same plate thickness at their positions of attachment to the cylindrical shell, the plate thickness of the shell being determined by the thickness of the plate in the heads. The shell is fabricated by forming plate sections to shell diameter and then welding them into annular shell sections. The latter are united by girth welds at their meeting edges and the hemispherical heads are then welded thereto. The welds are X-rayed and if any defects are found the defective welds are removed and replaced. The construction is then stress relieved. For pressure vessels thus fabricated such standards as those of the A. S. M. E. code for unfired pressure vessels limit the permissible value of the design stress on the welds to not more than 90% of that allowable for the plate metal of the components of the vessel joined by the welds.

The remainder of the pertinent pressure vessel consists of successively applied and substantially concentric bands of sheet metal each individually clamped circumferentially upon the shell and secured by a longitudinal seam weld formed between its ends while the band is held in clamped condition. Preferably, each band is heated before the welding and the tightening of the band is such that the shell is placed under compressive stress. These bands are applied throughout the length of the shell, and a plurality of them are directly superimposed and arranged to form separated sections of superimposed bands along the length of the shell. This results in a multiple layer construction without girth welds between the bands of successive sections.

Such standards as the A. S. M. E. code for pressure vessels permit the design of pressure vessel welds, when not X-rayed and annealed, with unit design stresses in the metal of the weld, limited to 80% of the metal of the adjacent sheet or plate. As the stresses in the metal of the wall of a vessel subjected to internal pressure are greatest at the internal wall and decrease progressively to the outer layers or laminae, it will be evident that outer layers are subject to much lower unit stresses, and by the selection of the thickness of the inner welded, X-rayed and heat treated cylinder with respect to the thickness of the added bands, it is possible according to the present invention to attain a maximum unit stress in the bands which is 80% of the permissible unit stress for the metal used in the body portion of the weld.

The resulting pressure vessel is one in which the average stress throughout the wall thickness of its cylindrical section is approximately the same as that required for a single wall thickness vessel, welded, stress relieved, and X-rayed, although more than 50% of the wall thickness requires no stress relieving or X-raying. Furthermore, the total wall thickness of the cylindrical section of the illustrative pressure vessel is no greater than that required for a unitary plate welded construction which has been totally stress relieved and X-rayed.

Other objects of the invention will appear in the following description which refers to the accompanying drawings.

In the drawings:

Fig. 1 is a longitudinal vertical section of the illustrative pressure vessel;

Fig. 2 is a transverse vertical section on the line 2—2 of Fig. 1;

Fig. 3 is a detail view showing the offset arrangement of the longitudinal welds in successive laminae of the outer part of the wall of the cylindrical section of the illustrative pressure vessel;

Fig. 4 is a detail view showing a section of a girth weld in the inner shell construction and indicating the lack of similar welds between the bands of successive sections of the outer shell;

Fig. 5 is a partial vertical section (longitudinally of the pressure vessel) showing the modification of the construction of a section of the illustrative pressure vessel associated with a side nozzle welded to the inner shell and extending through additional bands;

Fig. 6 is a vertical section on a plane transversely of the pressure vessel and passing through the center of the nozzle shown in Fig. 5;

Fig. 7 is a partial longitudinal section showing a pressure vessel with a modified head construction;

Fig. 11 is a plan of apparatus for clamping the bands upon the inner shell prior to the welding of the opposite ends of the bands together;

Fig. 12 is an elevation of the apparatus shown in Fig. 11, showing the pressure vessel in transverse vertical section;

Fig. 13 is a sectional view of the hydraulic jack for the band applying device;

Figure 16:
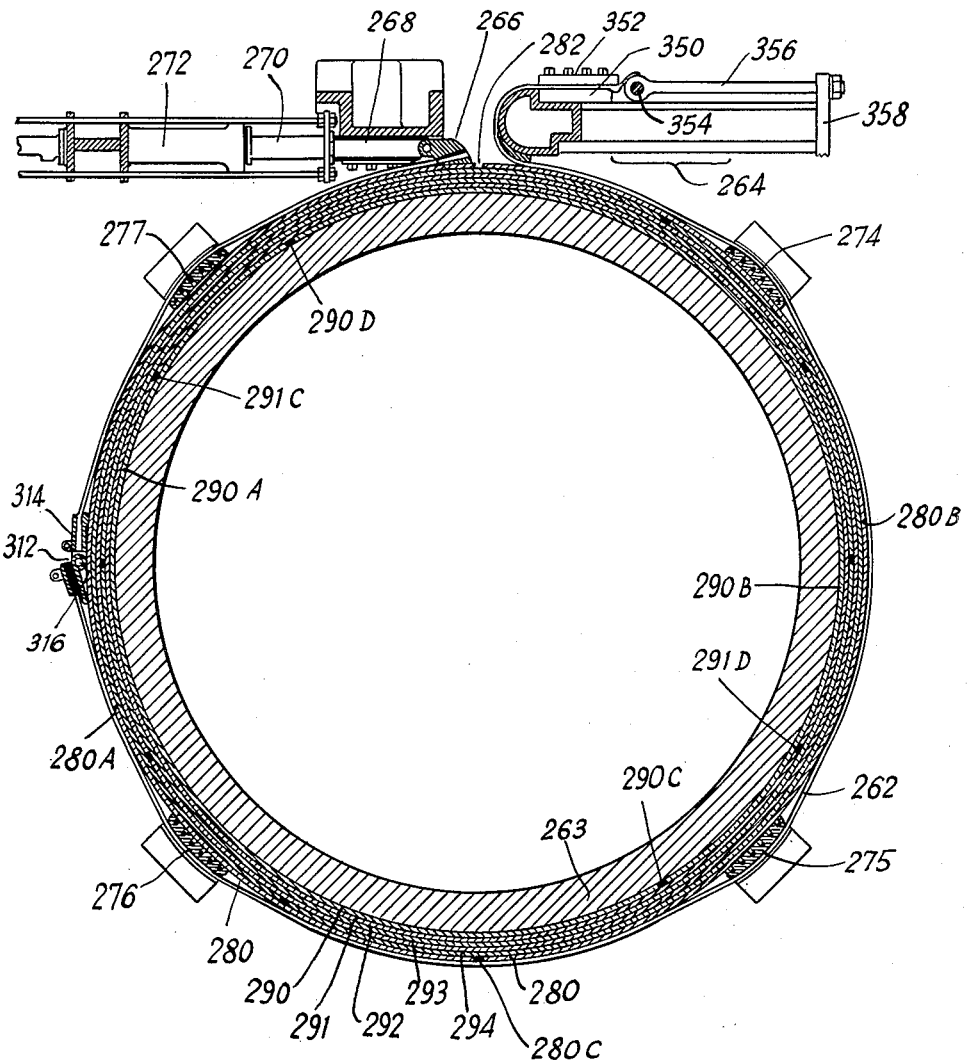

Figs. 14 and 15 are sections on the lines 14—14 and 15—15, respectively, of Fig. 13;

Fig. 16 is a transverse vertical section through a partially completed pressure vessel, illustrating also an embodiment in which each band is heated and then immediately welded while in heated condition;

Fig. 17 is a longitudinal vertical section on the line 17—17 of Fig. 18, showing one of the unit electrical heaters;

Fig. 18 is a plan of a heater unit;

Fig. 19 is a transverse section on line 19—19 of Fig. 18;

Fig. 20 is a detail view showing the manner in which each heating element is secured in the heater;

Fig. 21 is a side elevation of the drum banding apparatus; and

Fig. 22 is an end elevation of the drum banding apparatus.

Referring to Fig. 1 of the drawings, the thickness of the inner shell is determined by the minimum thickness of the metal required for the hemispherical heads 10 and 12, these heads involving the most effective use of metal for a given working pressure.

As shown, the inner shell consists of a plurality of annular sections 14 and 16 made up of single plate sections formed to the diameter of the shell. For pressure vessels of large diameters each of these sections may involve a plurality of segments, but in the illustrative construction each section involves a single plate bent to circular form with its opposing ends united by a single longitudinal weld 18.

After the annular sections of the inner shell are fabricated, they are fixed in alignment and then united by a girth weld 20 to form the inner cylindrical shell. Thereafter the forged hemispherical heads 10 and 12 are similarly united with the inner shell by the circumferential welds 22 and 24.

All of the welds uniting the parts of the inner shell are then completely X-rayed as a check upon the quality of the welds. If defects are found the defective weld metal is removed and replaced. In this connection the present invention involves important advantages due to the fact that it permits the employment of metal plates much thinner than those which are required when the entire vessel is of a single plate construction. In the first place, the quality of the thinner plates is apt to be much more uniform and otherwise superior to that of plates of greater thickness. In the second place, the X-rays of the welds, because of their relative thinness can be of high quality. In single plate constructions for very high pressures, the thick plates are joined by welds of such depth that the maximum effective range of the X-ray equipment is approached, if not exceeded. Thirdly, the cost of making X-rays of the thicker welds is considerably more than that for the smaller welds, the time of making each X-ray varying directly with the square of the depth (or thickness) of the weld.

After it is determined that all of the welds of the inner shell are of the desired high quality, the shell is placed in a furnace and stress relieved. The shell is then allowed to cool before application thereto of the components of the outer shell.

As shown in the drawings, the outer shell consists of four series of bands 30, 32, 34, and 36. They are preferably thin plate sections which are separately formed around the inner shell and tightly clamped thereon by the apparatus illustrated in Figs. 11–15. This apparatus includes a looped cable 40, the ends of which are anchored in clevises 42 and 44 while the middle part of the loop is seated within the groove 43 of the yoke or sheave 45 at the forward end of a base or frame 46. This frame is preferably of a heavy steel construction in order to successfully withstand the reactions of the mechanism carried thereby. That part of the frame extending from the hydraulic jack 100 to the left in Figs. 11 and 12 includes a body plate 102, the side web plates 104 and 106, the end plate 108, and the rear block 110, all of which are preferably welded together in the relationships indicated.

At the top of the body plate 102 are eye rings 112 and 114 preferably welded to the body plate at the positions indicated. These rings are for the purpose of handling the entire band tightening mechanism and for moving it from one position to another along the drum upon which it is to be applied, and from one position to another in the shop. The eye ring 112 is preferably located at the balancing point of the mechanism.

The clevis eye bolts 54 and 56 extend through openings in the rear block 110 and are disposed on opposite sides of the body plate 102. They are held in their operative positions, and may be adjusted by the screw-threaded elements 50 and 52, threaded upon the end of the eye bolts and abutting against the rear surface of the heavy block 110.

That part of the band tightener already described may be referred to as a backup strut, and at its forward end a heavy steel end plate 108 is maintained in a vertical position by welds which unite it with the forward end of the body plate 102 and the web plates 104 and 106.

That part of the band tightener frame at the right in Figs. 11 and 12 may be termed a bridge piece 123. It includes longitudinal side plates 120 and 122, rigidly bolted by the elements 130—137 to the blocks 140 and 142, and similar elements rigidly welded to the end plate 108 and the body plate 102 of the backup strut. In order that the bridge piece may be readily and accurately placed in the correct position relative to the backup strut, assembly keys 150 and 152 are driven into openings each of which is partly formed by a channel in one of the side plates while its remainder is formed by one of the channels in the blocks 140 and 142, or other associated elements of the backup strut construction.

At the forward or right hand end (Figs. 11 and 12) of the bridge piece, there are upper and lower cross plates 154 and 156 preferably welded to the forward ends of the side plates 120 and 122. As indicated in Figs. 13 and 15 of the drawings, these cross plates carry fixed guide blocks 160—163. The guide blocks 160 and 161 are welded to the under side of the cross plate 154 and are spaced so that the guide member 166 may slide in the space between them. A similar relationship exists between the lower guide member 168 and the guide blocks 162 and 163 which are secured to the upper side of the lower cross plate 156.

The parallel guide members 166 and 168 are rigidly secured to the yoke or sheave 45 in the positions illustrated in Fig. 13 of the drawings and this yoke is rigidly secured to the forward end of the piston 170 of the hydraulic jack. The guide members 166 and 168 are preferably of heavy steel construction and are welded to the yoke 45 on its upper and lower surfaces, respectively. The guide member 166 has an upper projection 172 at its rearward end, and a similarly arranged downward projection 174 of the guide member 168 cooperates with the projection 172 and the cross plates 154 and 156 to limit the forward movement of the yoke 45 and the piston 170 when the apparatus is being used to tighten a band upon the inner shell.

With the ends of the cable anchored within the clevises 42 and 44 and the intermediate portion of the cable wrapped around a band as indicated in Fig. 12 of the drawings, the band is tightened upon the inner shell by the flow of pressure fluid through the tube 180 and the duct 182 which communicates with the space 184 (Fig. 13) rearwardly of the piston 170 and within the hydraulic cylinder 186. Very high hydraulic pressures are involved in this operation, and leakage of the pressure fluid is prevented by the gland elements 190—197 secured at the forward or right hand of the cylinder 186, as indicated in Fig. 13.

A backing-up strip or band 35 (Fig. 2) is interposed relative to the band 34 and the shell 16. It is not welded to the shell 16, and its opposite ends may be spaced from each other as indicated at 200 in Fig. 12. An important point with reference to the use of this backing-up strip is that its ends are remote from the position 202 at which the ends of the first band 34 terminate.

Before the pressure of the band tightener is applied (with the elements in relative positions somewhat similar to those indicated in Fig. 12 of the drawings), the end 204 of the band 34 is positioned below the band tightener apparatus at such a distance that tack welding of the ends of the band 34 between the two parts of the band tightening cable, will be facilitated.

After the end 204 of the band 34 is positioned as shown, the band tightener is lowered upon the band and adjusted to its desired position by two sets of screw-threaded elements 210—214, there being a set on each of the side plates 104 and 106.

As fluid enters the space 184 to force the piston 170 forwardly and tighten the cable, there is coordination of the cable stretching and the band bending action to eliminate bends or folds in the band when it has received its final tightening upon the inner shell. The weight of the tightener has an anchoring effect on the band at the position R (Fig. 12) and the stretch of the cable is cumulative from that position clockwise around the inner shell.

After the final tightening, tack welds are formed between the adjacent ends of the band 34 (at 202), the backing-up band 35 preventing the development of local stresses in the metal of the inner shell 16 by this welding.

After the tack welds between the ends of the band 34 are made, a valve in an outlet tube communicating with the space 184 is opened. Thereupon, the cable 40 is loosened upon the drum and the piston 170 is pushed back to the position in which it is shown in Fig. 13 by the admission of fluid to the push back cylinders 220 and 222 formed by bores within the piston 170. This fluid passes to the cylinders 220 and 222 through the tubes 224 and 226 which are in communication with bores 228 and 230 formed in the rods 232 and 234. These rods are secured at their forward ends within openings in the guide blocks 161 and 163 in the manner indicated in Fig. 13, and their opposite ends are fitted within gland elements 240—246 disposed between the rods and the metal of the piston 170 and secured in these positions by the cap screws 250 which are screw threaded into the piston.

The handling of the band tightening mechanism is also facilitated by the hook plates 252 and 254 (see Fig. 11) which are welded to the side plates 120—122 in the positions shown.

Successive bands such as the bands 31—33 and 75—82 (Fig. 5) are secured in position in the manner above indicated, complete welds being formed between the adjacent ends of each tightened band immediately after the removal of the band tightener therefrom.

When the bands are considerably wider than the distance between the adjacent shell encircling loops of the band tightener cable, the first band tightening and welding operations take place along the longitudinal center of a band and the successive band tightening and welding operations take place first at one side of the zone of the first band tightening, and then at the other side.

Preferably, the longitudinal welds 18 of the inner shell and the successive welds 70—73 of the laminae of the outer shell are spaced circumferentially of the shell as indicated in Fig. 3 of the drawings. There are no circumferential welds at the junctions of the outer shell sections, as indicated in Fig. 4.

At one end of the pressure vessel, the ends of the outer shell laminae adjacent the head 12 preferably terminate at a plane including the line A—B which is a diameter of the hemispherical head 12. A similar relationship of elements applies at the other end of the pressure vessel, the line C—D (in the plane in which the adjacent ends of the adjacent laminae terminate) being a diameter of the hemispherical end 10 within a plane at which the adjacent bands terminate. With this construction, and with the effective number of bands applied adjacent the heads, all material of the pressure vessel is subject to the same unit stress, and no bending stress exists at the junctures of the heads and the cylindrical section of the shell.

Figure 8:
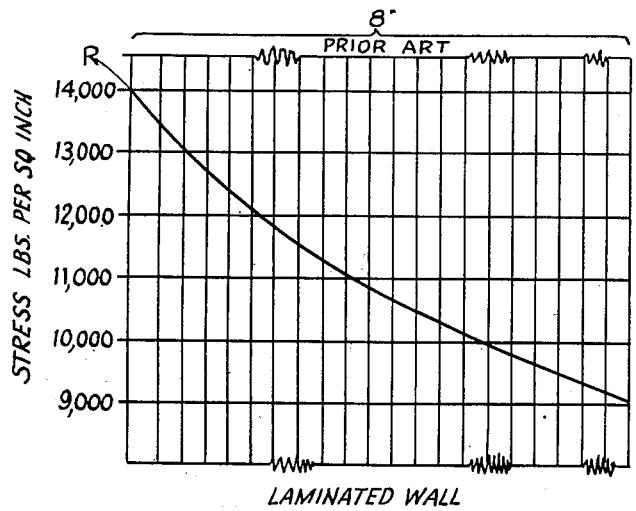
Fig. 8 is a diagrammatic view indicating a stress curve through the wall of a prior art laminated pressure vessel wall.

Comparing the illustrative construction with a pressure vessel which is entirely constructed of such thin laminations as those 32, 34, and 36 of the present construction, and if it is assumed that the recognized construction code specifies a wall thickness of 8" for the wholly laminated vessel, then, for the same inside diameter, and same pressure, the illustrative pressure vessel requires a wall thickness of only 6.4314 inches to maintain all stresses within code limitations. Such a comparison will be indicated from an inspection of Figs. 8 and 9 of the drawings. Fig. 8 illustrates the prior art construction where a laminated pressure vessel not stress-relieved and not X-rayed, for certain conditions of pressure and radius must have a wall thickness of approximately 8", the maximum permissible stress being 80% of 17,500 per sq. in., or 14,000 per sq. in. at the inner lamination, or at point R in Fig. 8.

Figure 9:
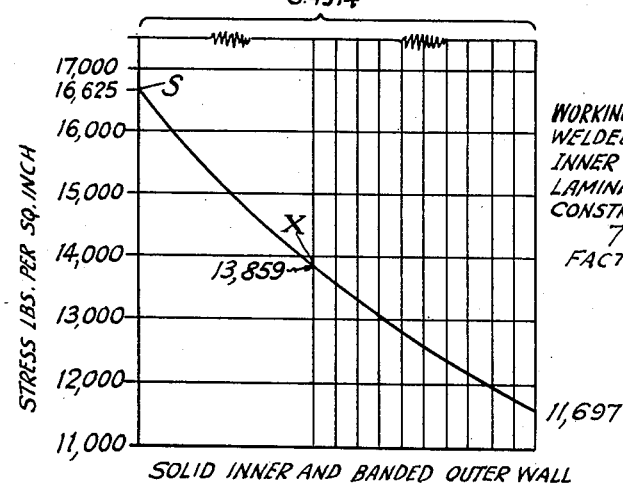
Fig. 9 is a diagrammatic view of the nature of a stress diagram for a wall of a vessel constructed in accord with this invention and for the same working pressure as the Fig. 8 vessel.

Fig. 9 illustrates stress conditions in a wall of a vessel constructed according to this invention for the same radius and same working pressure. The Fig. 9 wall has a thickness of approximately 6.43" and maintains all stresses within the code limitations for the two types of welds employed. The maximum stress permissible on the inner shell which is stress-relieved and X-rayed, is 95% of 17,500 per sq. in., or 16,625 per sq. in., and the maximum stress permissible at the point X, or at the first band (which is not stress-relieved and not X-rayed), is 80% of 17,500 per sq. in., or 14,000 per sq. in. It will be noted that the stress in the first band, or point X, is 13,859 per sq. in., somewhat within the value permitted by the code authorities.

Figs. 8 and 9 take into consideration the facts that the magnitude and variation of stress through the wall thickness of a cylinder under internal pressure follow certain natural laws, the stress being at a maximum on the inner shell surface, and at a minimum on the outer shell surface. The difference between the stress on the inner and outer shell surfaces is equivalent to the internal pressure. Further, the stress throughout the wall thickness varies as the square of the radius from the center of the cylinder.

Figs. 5 and 6 indicate a construction to be employed when a nozzle section 63 is provided for a section of the drum. This nozzle section extends through a side opening in the inner shell and is welded to a re-enforcing ring 64, which in turn is welded to the shell, the elements 63 and 64 being preferably welded in position before the inner shell is stress relieved.

Externally of the inner shell, and externally of the major laminations of the outer shell there are applied several additional bands 75 to 82, inclusive. These bands have openings for the nozzle section 63. The bands are clamped around the shell in the manner above described, being arranged so that the nozzle openings in successive bands will be substantially coaxial.

Each of the bands 75—82 is secured in the position in a manner similar to that above described. These bands are, as shown, of gradually decreasing width and their number is such that there is adequate compensation for the weakening of the drum metal occasioned by the provision of the nozzle opening.

After all of the additional bands 75—82 are applied the flanged nozzle section may be secured to the section 65 by the weld 66.

Fig. 7 also shows a drum provided with a manway 83 about which the head is reinforced by an internal ring 82 and an external ring 84. The former is constructed so as to provide a seat 86 for the manway cover 88 which is held in its drum closing position by means of through-bolts 90 and 92. These elements extend through a bar or plate 94 which contacts with the external plate structure 84.

Figure 10:
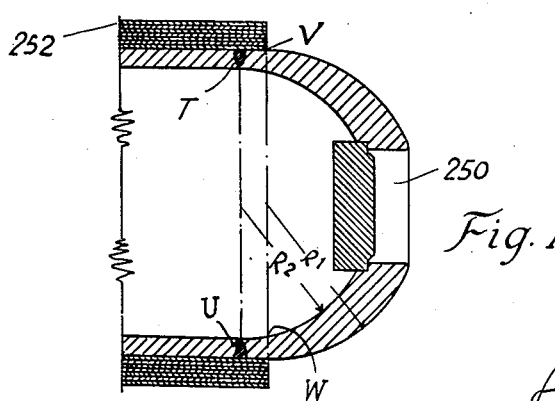
Fig. 10 is a partial section of a pressure vessel of modified head construction.

Fig. 10 shows the illustrative type of pressure vessel with a drum head forged to provide a manway 250. With this construction the wall of the head gradually increases in thickness from the end of the shell represented by the line TU, to the manway. The external surface of the head, to meet such conditions, may have a spherical surface of the radius R′ with its center in the line VW while the inner surface of the head may have a similar surface of the radius $R^2$ with a center in the middle of the line TU. In this modification, and for maintaining proper conditions with reference to radial dilatation, the bands of the outer shell 252 extend beyond welds at the ends of the line TU and to the plane of the line VW.

The use of a thicker inner section and relatively thin re-enforcing bands reduces the tendency of the inner section to be strained through a difference in temperature of the contents of the vessel. Dividing the outer shell into separated sections also contributes to the minimizing of such strain due to a difference in expansion, and, combined with the thicker shell of the inner section, provides a construction which is less subject to local strains (which may cause trouble through corrosive action) than a vessel made up entirely of a number of relatively thin bands.

A modified method of fabricating such a vessel involves the preheating of each lamina before tightening, and the holding of the preheated band in tightened position upon the next innermost cylindrical surface during the welding of the longitudinal seam. When the entire circumferential length of each open lamina is so preheated, and the closure welding of the longitudinal seam to form a closed band is accomplished while the lamina is at an elevated temperature, the subsequent contraction of the band tightly fitting an inner cylindrical surface results in a tensioning of the band, and the application of compression forces to the contacted underlying cylinder.

The residual tensioning of the individual bands by temperature reduction from that occurring at the time when they are individually tightened and welded on a cylindrical surface, augments that which occurs in the previously described method of fabrication, where residual tensioning of bands results from the dilation of the inner shell upon release of the clamping and squeezing forces as applied by the cable, from the tension induced by the stretch of the tightening cables, and from the contraction upon cooling of the longitudinal extending fusion weld.

This manner of attaining an appreciable residual tensioning of the outer lamina is particularly advantageous when the design characteristics of the vessel indicate the selection of an inner shell of such a thickness that tightening forces of great magnitude and heavy apparatus would be required if the tensioning of the closed lamina were to result primarily from the dilation of the inner shell after removal of the clamping and squeezing means.

With the use of apparatus which facilitates introduction of the lamina preheating step, permitting the closing of the lamina to form the bands while under predetermined temperature conditions, it is possible to develop predetermined tension forces in the individual bands upon cooling, which are greater than the combined tension stresses otherwise effected.

In the fabrication of the illustrative pressure vessel by the apparatus indicated in Figs. 16 to 22, inclusive, of the drawings, each band is temporarily secured about the shell 263 and it is thoroughly heated before it is tightened and welded. After heating, the band is tightened around the shell by a plurality of circumscribing flat wire ropes, such as the rope indicated at 262 in Fig. 16. This rope is secured at one end to a fixed anchoring structure, indicated generally at 264, and its other end is secured through a shoe 266 and a shoe holder 268 to the piston 270 of an hydraulic cylinder 272.

Rope 262 has secured thereto at circumferentially spaced positions the unit heaters 274—277, the structure of which is indicated in Figs. 17-20. They are so disposed as to direct heat against a band, such as the band 280.

The band 280, for example, is temporarily secured about the drum (and the underlying bands) with its ends slightly circumferentially spaced, at the position of the ultimate weld, as indicated at 282. This temporary positioning of the band may be attained by welding or such preforming of the band that it will remain in position around the shell, or the shell and its underlying bands, without any tightening of the rope 262.

After the rope 262 is in position, as shown in Fig. 16, the drum with the bands thereon is rotated past the fixed heaters so that the entire band 280 will be heated. After this is accomplished and the outer band has attained the desired temperature (for example, 150 F.), the hydraulic mechanism 272 is operated to tighten the rope 262 on the band 280 and the opposed ends of the band are welded together as at 282. This welding is done immediately, in order that there shall be no substantial cooling of the band prior to welding.

The invention also comprehends the forming of each band in two semi-circular halves and the uniting of those halves by welding while they are held in shell circumscribing position. In such case the weld holds the band in its position by reason of making of the weld in such a way that the underlying metal (shell or band) forms a part of the weld. In this event hydraulic tightening mechanism may be employed at each free end of each band so that the band would be pulled uniformly each way from its point of attachment to the underlying band, the stretch of the rope also being coordinated with the tightening of the band.

When the steel sheets for the bands are of a thickness of the order of ¼", or greater, each half band is preformed to closely fit the underlying surface. For example, the band 280 is preformed in two semi-circular parts 280A and 280B which are then fitted upon the underlying band 294. While held in this position they are joined by the weld 290C which includes metal of the underlying band 294. This secures the band 280 to the shell through the underlying bands. After heating and tightening, the band 280 is completed by the weld at 282, the halves of the band being stiff enough to permit the use of the tightening apparatus shown in Fig. 16. In this mode of procedure it will be understood that the underlying bands 290—294 have been similarly installed, the preformed halves 290A and 290B of the first band, for example, being initially united and held on the shell 263 by the weld 290C. After heating and tightening this band is completed by the weld 290D. The halves of the band 291 were likewise united by the welds 291C and 291D, in a similar procedure, and the remaining bands were installed in the same way.

With the above described procedure (involving the preheating of each band) the tension of each band 280 caused by the subsequent cooling of the weld, and that caused by the cooling of the band itself, are cumulative from a stress standpoint, with respect to the stress imposed on the vessel by the tightening of the band by the hydraulic mechanism, the shell being put under compressive stress and the last installed bands under tension stress.

A plurality of the tensioning flat wire ropes are utilized in the installation of each band. Six of such wire ropes are indicated in Fig. 21 of the drawings, four of them being disposed between the wire ropes 262 and 262'. The cable or rope anchoring structure and the hydraulic mechanism are carried by a bridge 300 adjustably suspended from the top structure of a gantry 302 which is disposed so as to be movable along the rails 304 and 306. The bridge 300 is vertically adjustable on the gantry by means of manually controlled hoists 308 and 310, and in the illustrative procedure the bridge is elevated to permit the temporary installation of each band in its position, and thereafter, the bridge is dropped upon the band so that each one of the flat wire ropes (such as 262 or 262'), may be secured in its operative position by bringing the opening in the rope anchor clevis 312 into register with the coacting opening in the clevis 314. Thereupon the pin 316 is threaded through these openings to hold the rope and its heaters in their operative positions, it being understood that each of the several ropes is similarly secured in operative position along with its heaters.

To provide for rotation of the drum during the uniform heating of a band one end of the drum is secured to a head 320, which is rotatably mounted in a bearing at the top of a pedestal 322.

At its other end the drum is fixed to a drum adaptor, indicated generally at 324. This is of heavy plate structure with a main vertical plate 326 to which are welded axially extending plates, such as 328 and 330. The latter may be conveniently attached to drum by welding as indicated. Fixed to the other side of the main plate 326 is a heavy annular structure 332 having an upstanding ring 334 supported by the rotatably mounted flanged rollers 336 and 338. These rollers are driven by a motor 340, with speed reducing mechanism 342 interposed relative to the motor and the rollers.

One end of each flat wire rope, such as rope 262, is anchored by a structure, such as that indicated in Fig. 16. This includes a cable clamp base 350 with a clamp top 352, the latter being tightly bolted to the base 350 and the body of the structure 264. Beyond the clamp base 350 the rope is anchored to a pin 354 which passes through the eye of an anchor bolt 356, secured at its other end to a plate 358 which is rigid with the structure 264.

The heaters carried by each of wire ropes, such as 262 and 262' (Fig. 21), are of the electrical resistance type, their structure being indicated in Figs. 17 to 20. Each includes a heat resistant body 400 with parallel grooves in its heating space for the reception of the rod-like heating elements 402—407, each of these elements being disposed with reference to the body 400 in the manner indicated in Figs. 17–20. The upwardly bent ends of the rods, such as 408 and 410, are disposed within housings 412 and 414 in which the electrical connections are made. These connections are such that the heating rods are connected in parallel. Each rod is held in its groove in the manner indicated in Fig. 20. This involves the use of clips, such as 420 and 421, which are secured to the body 400 with their inner ends extending over the rods from opposite sides of the grooves.

When the ropes are tightened, they exert inwardly directed forces on the outer surfaces of the heater bodies and these forces are transmitted through those bodies to the shell or shell lamina construction encircled by the ropes, the inner facing of the heater bodies being of a cylindrical configuration. Between the heaters, the ropes make contact with the outermost band and direct pressure directly upon the underlying structure. With the heaters arranged in the manner described the band tightener is operable without disturbing the placement of the heaters. In other words, the heaters are so constructed and arranged that, even though they are secured to the ropes of the band tightener, they do not interfere with or detract from the functioning of the tightener. Conversely, the operation of the band tightener does not interfere with the operation of the heaters.

The refractory body 400 is embraced by a metal backing 430 with insulation material 432 interposed, as indicated at Fig. 19.

The above indicated method of manufacture is particularly adapted for the construction of heavy pressure vessels in which the thickness of the inner shell may run as high as 6 inches or higher. In such a vessel the total thickness of the wall including the inner shell and the bands may be greater than 12 inches, and the individual bands may be of such thickness as one-quarter inch.

The welds of adjacent bands are preferably offset for reasons referred to in the early part of the specification, and other characteristics and attributes of the first described procedure and the resulting pressure vessel also apply to the procedure and the pressure vessel last described.

Summarizing the fabrication method above described, it involves:

(a) The formation of a welded shell, or pressure vessel, of relatively thick walls, (b) Stress relieving the shell or pressure vessel, (c) Preforming relatively thin plate or sheet sections to curvature of the order of the shell curvature, (d) Successively fitting the sheet sections upon the shell and (and any underlying shell and band structure) securing them thereon, (e) Uniformly heating each sheet section upon the shell by rotating the shell and the band through one or more heating zones, (f) Tightening each heated sheet section upon the shell by circumscribing tensioning forces of considerable magnitude, (g) Welding together the adjacent ends of each heated circular sheet or band while tensioned by the tightened apparatus, and (h) Repeating these operations until a banded section of sufficient thickness is produced.

This application is a continuation-in-part of my parent application, Ser. No. 393,876, filed May 17, 1941 (now Patent No. 2,376,351, May 22, 1945); and also a continuation-in-part of my pending application No. 530,178, filed April 8, 1944, now Patent No. 2,490,795; and a continuation-in-part of my pending application No. 659,269, filed April 3, 1946, now Patent No. 2,585,237.

While in accordance with the provisions of the statutes I have illustrated and described herein the best form of my invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. In apparatus for the manufacture of multi-layer pressure vessels, means for supporting and turning a heavy pressure vessel cylinder or shell, band tightening and heating apparatus including fluid pressure operated mechanism, a support for said mechanism extending transversely of the shell and having loop anchoring means in opposed position relative to said mechanism, and a plurality of aligned loops normally adapted to encompass the shell and a shell encircling metallic band, heater units secured to said loops in circumferential arrangement whereby a band is heated as it is turned with the shell within the arrangement of heaters, each loop having one end secured to said anchoring means and its opposed end secured to the fluid pressure operated mechanism whereby operation of the latter simultaneously tightens the loops around the shell and its incomplete band to impose substantial compression stress on the former, the loops being sectional with each loop including a plurality of sections or segments normally joined by readily detachable means to facilitate initial placement of the pressure vessel shell within the apparatus and the similar placement of each of the successive bands about the shell.

2. In apparatus for the fabrication of multi-layer pressure vessels having successive shell encircling contacting bands or laminae, a pressure vessel support permitting the turning of the pressure vessel, a plurality of aligned shell encircling steel loops, power means operatively associated with the loops for simultaneously contracting the loops about a pressure vessel shell and a metallic band or laminae thereon to tighten the band upon the shell and place the latter under compressive stress, and band heating means disposed in circumferential arrangement about the shell in the zone of the loops and simultaneously applying heat in the zone subject to the compressive force application of the loops.

3. In apparatus for the manufacture of multi-layer pressure vessels; means for supporting and turning a heavy pressure vessel cylinder or shell; band tightening and heating apparatus including fluid pressure operated mechanism, a support for said mechanism extending transversely of the shell and having loop anchoring means in opposed position relative to said mechanism, and a plurality of aligned loops normally adapted to encompass the shell and a shell encircling metallic band, spaced heater units secured to said loops at their inner sides in circumferential arrangements whereby a band is heated as it is turned with the shell within the arrangement of heaters, each loop having one end secured to said anchoring means and its opposed end secured to the fluid pressure operated mechanism whereby operation of the latter simultaneously tightens the loops around the shell and its incomplete band to impose substantial compression stress on the former, the loops being sectional with each loop including a plurality of sections or segments normally joined by readily detachable means to facilitate initial placement of the pressure vessel shell within the apparatus and the similar placement of each of the successive bands about the shell.

4. The combination of claim 1 characterized by the alignment longitudinally of the apparatus of the openings between the ends of the incomplete loops and the radial alignment of the opening between the spaced ends of an incomplete band and said loop openings to provide free welding access to the zone of the ends of the band.

5. The combination of claim 1 characterized by a plurality of the fluid pressure operated mechanisms disposed in a row at one side of the zone of the spaced band ends, and a plurality of the loop anchoring means disposed in a row at the opposite side of said zone to permit free welding access to the weld seam groove between the opposite spaced ends of a tightened band.

6. In apparatus for the manufacture of multilayers pressure vessels; means for supporting a pressure vessel cylinder or shell; band tightening apparatus including a row of fluid pressure operated mechanisms, a support for said mechanisms extending transversely of the shell and having a row of loop anchoring means in opposed and circumferentially spaced relation to said mechanisms, and a plurality of loops normally encompassing the shell and an interrupted shell encircling metallic band, each loop having one end secured to said anchoring means and its opposed and circumferentially spaced end secured to the opposite fluid pressure operated mechanism whereby operation of the fluid pressure operated mechanisms simultaneously tightens the loops around the shell and its incomplete band to impose substantial compression stress on the former, the openings between said opposed loop ends and the openings between the loop anchoring means and the pressure operating mechanisms being aligned in the direction assumed by the longitudinal axis of the pressure vessel shell.

CECIL H. GAY.

REFERENCES CITED

The following references are of record in the file of this patent:

UNITED STATES PATENTS

| Number | Name | Date |
|---|---|---|
| 1,301,995 | Arthur | Apr. 29, 1919 |
| 1,365,193 | Sessions | Jan. 11, 1921 |
| 1,663,255 | Hynes | Mar. 20, 1928 |
| 1,704,413 | Wait | Mar. 5, 1929 |
| 1,770,763 | Wolfstyn | July 15, 1930 |
| 1,775,311 | Halle | Sept. 9, 1930 |
| 1,817,803 | Eaton | Aug. 4, 1931 |
| 1,892,178 | Stockfleth | Dec. 27, 1932 |
| 1,904,913 | Adams, Jr. | Apr. 18, 1933 |
| 1,920,791 | Hogan | Aug. 1, 1933 |
| 1,947,462 | Doorbar | Feb. 20, 1934 |
| 2,184,534 | Smith et al. | Dec. 26, 1939 |
| 2,287,197 | Sandberg | June 23, 1942 |
| 2,376,351 | Gay | May 22, 1945 |
| 2,490,795 | Gay | Dec. 13, 1949 |
| 2,517,853 | Eickmeyer et al. | Aug. 8, 1950 |